March 17, 1964                A. TRUHAN                3,124,903
CONTROLLED ENVIRONMENT ROOM SYSTEM
Filed Nov. 28, 1961                                    2 Sheets-Sheet 1
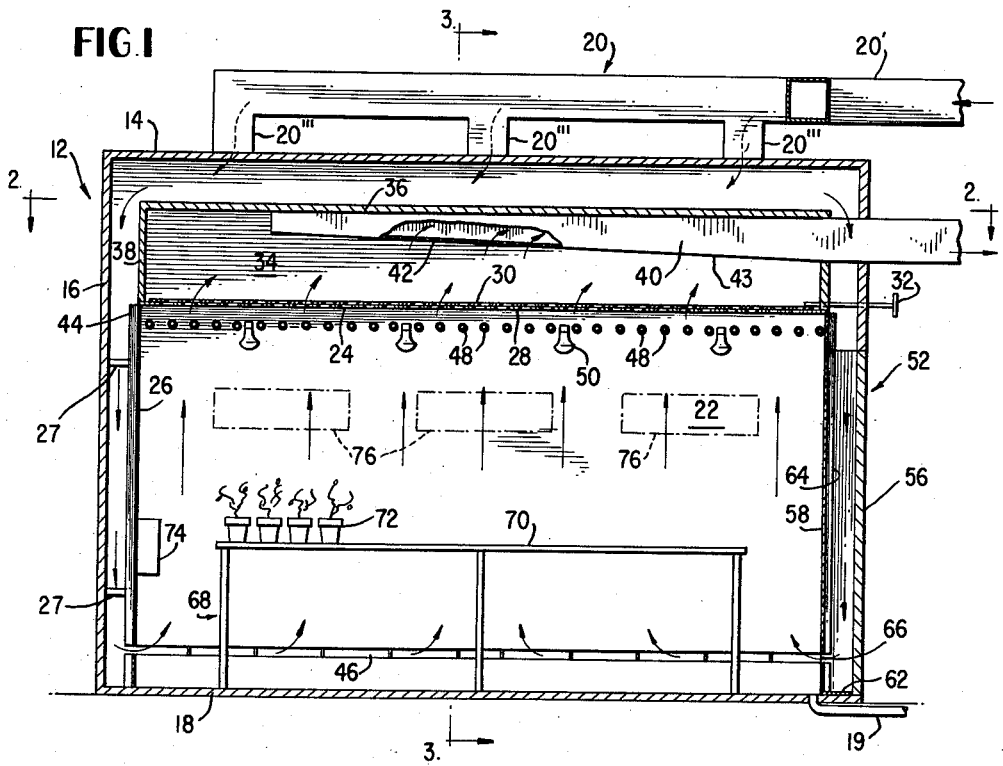
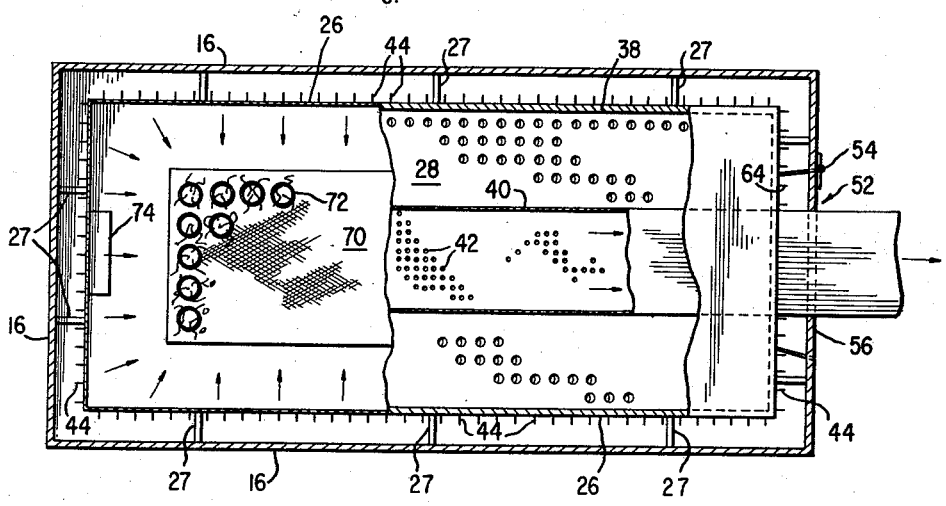
INVENTOR.
ANDREW TRUHAN
BY Stowell & Stowell
ATTORNEYS

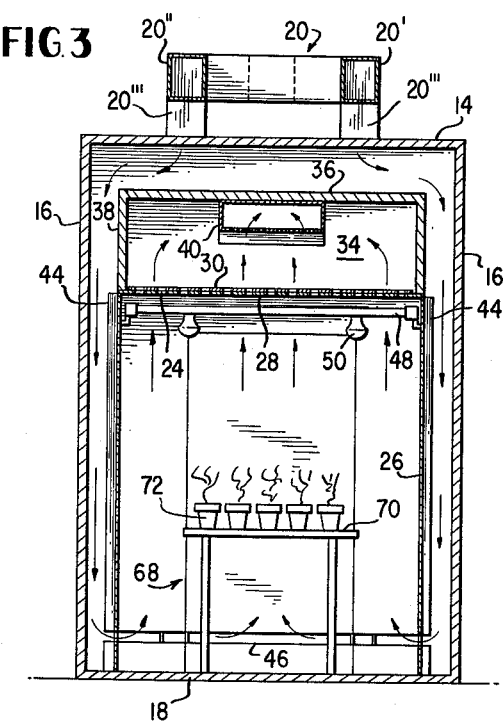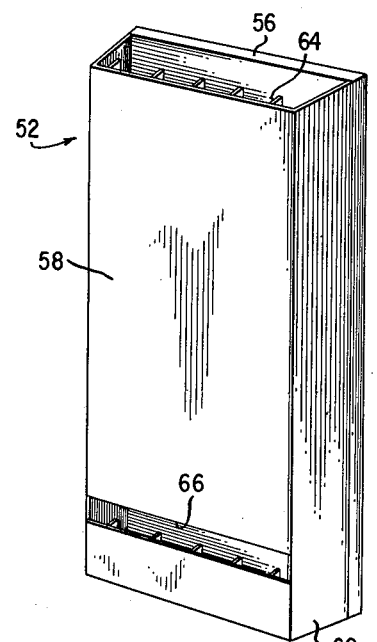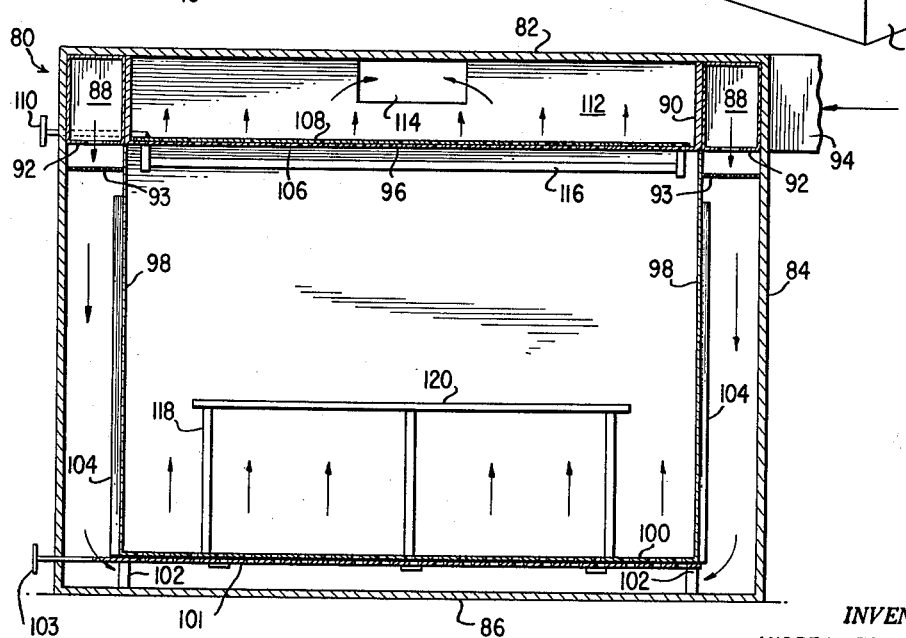

United States Patent Office 3,124,903
Patented Mar. 17, 1964

3,124,903
CONTROLLED ENVIRONMENT ROOM SYSTEM
Andrew Truhan, R.D. 3, Box 392T, New Brunswick, N.J.
Filed Nov. 28, 1961, Ser. No. 155,369
5 Claims. (Cl. 47—17)

The present invention relates to improvements in an air circulating controlled environment system wherein predetermined environmental conditions may be accurately maintained and more particularly to an apparatus for simulating actual environmental conditions having special utility in agricultural experimentation.

Among the most fascinating adventures of modern times involves the investigations of photosynthesis (synthesis of chemical compounds with the aid of the energy of sunlight in the presence of the chlorophyll in the green leaves of plants). The photosynthesis reactions are complicated and science has to date made a mere beginning in the understanding. However, due to the great economic significance of a successful outcome to the investigations, large amounts of time and energy are being expended to achieve a more complete understanding of the mechanisms of the process so that we may be able to find a simpler, more direct, more effective method of utilizing the sun's energy in agricultural processes. To this end, an object of the present invention is to produce an apparatus for simulating the conditions of nature for growing plants.

Another object of the invention is to produce an apparatus capable of providing a controlled zone having a source of electromagnetic radiation of appropriate wave lengths, air distributing means for effecting the desired air flow patterns within the zone, and heat distributing means cooperating to simulate any desired predetermined conditions.

Other objects and advantages of the invention will become apparent to those skilled in the art from the following detailed description of preferred embodiments of the invention when considered together with the attached drawings, in which:

FIG. 1 is an elevational view partly in section of an embodiment of the invention;

FIG. 2 is a sectional view of the embodiment of the invention illustrated in FIG. 1 taken along line 2—2 thereof with parts broken away to more clearly illustrate the structure;

FIG. 3 is a sectional view of the embodiment of the invention illustrated in FIGS. 1 and 2 taken along line 3—3 of FIG. 1;

FIG. 4 is a perspective view of an access door employed in the embodiment of the invention illustrated in FIGS. 1, 2 and 3; and FIG. 5 is an elevational sectional view of another embodiment of the invention.

Referring to FIGS. 1, 2, and 3, there is shown an apparatus constructed in accordance with the teachings of the present invention. The assembly includes an outer housing 12 having a top wall 14, side walls 16, and a bottom wall 18. The bottom wall 18 is provided with a drain pipe 19 for removing any accumulation of water which might form therein and is also useful for expelling water after the assembly has been washed down. The top wall 14 of the outer housing 12 is provided with an air supply inlet conduit 20 consisting of two main horizontally extending passageways 20′ and 20″ and downwardly extending passageways 20‴ communicating with the interior of the outer housing 12. The material used for fabricating the housing 12 is preferably of a heat insulating type.

Disposed within the outer housing 12 and spaced from the top and side wall surfaces thereof, is an inner compartment generally indicated by reference numeral 22. The inner compartment 22 includes a top wall 24 and side walls 26. The inner compartment side walls 26 are supported from and maintained in spaced relationship to the outer side walls 16 by a plurality spaced bracket or tie members 27 which are suitably connected to the inner surfaces of the outer walls 16 and the outer surfaces of the inner walls 26. The tie members 27 are sized and so spaced as not to materially interfere with the passage of air between the walls as to be more fully described hereinafter.

The top wall 24 is comprised of a pair of apertured plates 28 and 30 disposed in superposed relationship. The plates 28 and 30 may be moved relative to one another by any suitable means such as a handle 32 which extends through the outer housing 12. In the embodiment illustrated, the plate 28 is secured to the top edge of the side walls 26 and the plate 30 may be moved thereover by means of the handle 32 attached thereto. It will be appreciated that as the plate 30 is moved relative to the plate 28, the associated apertures of the plates may be aligned to any desired degree. In one position the apertures of the plates 28 and 30 may be completely aligned and by movement of the top plate 30 the apertures may be varied to a completely closed position. Therefore, it will be appreciated that the top wall of the inner compartment 22 can be completely closed, or can be caused to be opened to any selected degree to allow for the passage of more or less air therethrough.

The top wall 24 communicates with an outlet chamber 34 defined by a top wall 36 and side walls 38 which has an outlet conduit 40 disposed therein provided with a plurality of openings 42 in the bottom wall 43 thereof. The bottom wall 43 tapers generally across the outlet plenum chamber 34 to provide for substantially uniform removal of air from the chamber 34.

Within the space between the interior surface of the side walls 16 of the outer housing 12 and outer surface of the side wall 26 of the inner compartment, there is disposed a plurality of spaced vertically extending heat exchange fins or ribs 44 attached to the side walls 26.

Near the bottom of the inner compartment there is provided a slot or opening 46 in the side wall 26 extending around the entire peripheral dimension thereof.

Extending across the top of the inner compartment 22, slightly below the inner surface of the wall 24, there is a plurality of horizontally extending fluorescent lamps 48 arranged in parallel spaced relation. The lamps 48 emit electromagnetic energy typically in the ultraviolet region of the spectrum. Also, there is a plurality of incandescent lamps 50 arranged in spaced relation across the top of the inner compartment 22. The lamps 50 emit electromagnetic energy typically in the infrared portion of the spectrum.

Access to the inner compartment 22 is achieved through an access door 52 clearly illustrated in FIG. 4. The door 52 is typically hinged, as at 54, to the side wall 16 of the outer housing 12. Since air circulation about the entire outer surfaces of the side walls 26 of the inner compartment 22 is desired, the door 52 is of hollow construction having an outer wall 56, and an inner wall 58 spaced therefrom and side walls 60. A bottom wall 62 is provided while the top is maintained open. A plurality of parallel spaced vertically extending ribs or heat exchange fins 64 corresponding to the ribs 44, are affixed to the outer surface of the inner wall 58. Air flow is effected through the interior portion of the door 52 by travelling in through the open top and out through a slot 66 formed in the lower portion of the inner wall 58. The slot 66 is in alignment with slot 46 formed in the side walls 26 of the inner compartment 22.

A work table 68 is positioned within the inner compartment 22 and has a top or working area 70 of perforated material such as, for example, expanded metal. The perforated top 70 is effective to allow air being admitted through the peripheral slot 46 in the side walls 26 and the slot 66 of the door 52 to flow upwardly around the objects 72 supported thereon which typically may be potted plants.

Temperature and humidity sensing and control elements are maintained within an insulated panel box 74 which is mounted on the inner surface of the side wall 26 and is adequately shielded from the light energy and radiant heat energy emitted from the lamps 48 and 50 thereby enabling a true ambient temperature to be maintained within the inner compartment 22. Manifestly, the control elements within the panel box are effective to control the temperature and humidity of the air supplied by the inlet duct 20 from the air supply. To enable efficient sampling of the air within the inner compartment 22, a fan may be provided within the control panel box 74 which will effectively force the air across the sensing elements thereof. Further, it will be appreciated that the controls are preferably positioned at level within the compartment 22 approximately the same as the top 70 of the work table 68 so that the environment at the level of the material being treated, such as the illustrated potted plants 72, can be closely controlled and monitored.

In operation, air is supplied to the system through the inlet ducts 20 from a supply system, not shown, and is directed to a supply air plenum chamber defined principally by the inner surface of the top wall 14 of the outer housing and the outer surface of the top wall 36 of the outlet chamber 34. The velocity head of the supply air converts to static head in this plenum and is then converted to a velocity head and caused to flow downwardly over the outer walls of the inner compartment 22 between the inner surface of the side walls 16 and the outer surface of the side walls 26. The supply is thereby evenly distributed as it enters and passes through the slot or opening 46 near the bottom of the side walls 26. The air is then evenly diffused into the space under the table 68 and is balanced for distribution so that in rising through the perforated top 24, the evenly distributed upwardly rising air effectively avoids flutter of leaves of the plant 72. The air then rises through the compartment 22, passes the fluorescent and incandescent lamps 48 and 50, respectively, through the adjsutable apertures in the plates 28 and 30, and finally enters the outlet duct 40 through apertures 42 in the bottom wall thereof.

It will be appreciated that due to the apertured construction of the top wall 24, the air flow through the inner compartment 22 is equally balanced throughout the entire zone thereof. Further, through such construction, the static pressure within the compartment 22 may be varied by the position of the apertured plate 30 with respect to the apertured plate 28. Assuming the pressure or velocity of the air supplied to the overall system is constant, it can be varied in the inner compartment by moving the movable plate 30.

The energy emitted from the lamps 48 and 50 impinges on the interior of the side walls 26. To reduce the heat energy of the side walls 26 from re-radiating to the interior of the compartment 22, the heat is conducted through the wall 26 and the fins 44 and carried off by the air passing between the outer surface of the side wall 26 and the inner surface of the side wall 16.

To further aid in the absorption of the heat from the lamps 48 and 50, the sides 26 are fabricated from material of relatively high heat conductance and low reflective quality. The material of the inner compartment 22 can typically be formed of a material such as aluminum coated with a non-reflective coating. Or, alternatively, the inner compartment 22 could be formed of a plastic material.

It will be appreciated that since the lamps 48 and 50 are constantly swept with relatively cooler air, the temperature thereof is maintained such that they can operate at their maximum efficiency to emit light within a constant frequency range.

In certain instances the slots 46 and 66 may be equipped with both horizontal and vertical adjustment of the air flow. Also, if desired, there may be more than one peripheral slot formed in the apparatus.

In order to provide a larger zone of control within the interior of the inner compartment 22, additional slots or weep holes 76 may be formed in the side walls 26. A typical position of the holes 76 is shown in dotted lines in FIG. 1. When such a construction is employed, communication is established between the supply air plenum chamber and the interior of the compartment 22 through the slots or weep holes 76 in the upper portion of the inner compartment 22 as well as through the peripheral slot 46 in the lower portion of the inner compartment 22.

Typical dimensions for the outer housing 12 are approximately 9 feet wide, 14 feet long, and 8 feet high. With these dimensions, it has been found that temperature and humidity functions can be controlled to tolerances of plus or minus 0.5 degree Fahrenheit dry bulb with the humidity controlled within the tolerances of 0.5 degree Fahrenheit dry bulb fluctuations with the internal lighting provided by the lamps 48 and 50 of approximately 3500 to 4000 foot-candles.

Now referring to FIG. 5 there is shown another embodiment of the invention wherein the outer housing is generally designated by reference numeral 80. The outer housing 80 consists of a top wall 82, side walls 84, and a bottom wall 86.

An air inlet plenum chamber 88 is formed within the housing 80 and is disposed about the entire upper peripheral portion thereof. The plenum chamber 88 is defined by a wall 90 which depends downwardly from the interior surface of the top wall 82 of the housing. The bottom of the chamber 88 is formed by an apertured bottom wall 92. An air supply duct 94 effectively provides communication between a source of air, not shown, and the plenum chamber 88. Below and spaced from the bottom wall 92 is an apertured panel 93 which extends around the entire inner surface of the side walls 84 of the outer housing 80 and is coextensive with the bottom wall 92 of the plenum chamber 88.

An inner compartment is disposed in spaced relation within the outer housing 80 and consists of an apertured top wall 96, side walls 98, and an apertured bottom wall 100. The inner compartment is supported at the bottom wall by a plurality of legs 102. A plurality of parallel spaced vertically extending ribs or heat exchange fins 104 are suitably affixed to the outer surface of the side walls 98 of the inner compartment.

The top wall 96 of the inner compartment is comprised of a pair of apertured plates or panels 106 and 108 disposed in superposed relationship. The construction of the top wall 96 is the same as the construction of the top wall 24 of the embodiment of the invention illustrated in FIGS. 1, 2, and 3. The upper panel 108 is movable relative to the panel 106 and may be so moved by any suitable means such as a handle 110 which extends through the outer housing 80. It will be appreciated by moving the upper panel 108, the apertures therein may be caused to align themselves with the apertures in the associated panel 106 to thereby control the amount of air which can pass through the top wall 96.

The interior surfaces of the walls 82 and 90 define an outlet plenum chamber 112 having a suitable outlet opening 114 formed to extend through a portion of the wall 90 and the adjacent side wall 84.

Extending across the top of the inner compartment slightly below the inner surface of the top wall 96, there are a plurality of fluorescent lamps 116 and incandescent lamps, not shown. A work table 118 is positioned within the inner compartment and is supported by the perforated floor 100. The work table 118 has a perforated top 120 and in all respects may be identical with the work table 68 illustrated in the embodiment of the invention illustrated in FIGS. 1, 2, and 3.

Access to the inner compartment is achieved through an access door, not shown, similar to the door 52 illustrated in FIG. 4.

In operation of the embodiment of the invention illustrated in FIG. 5, air is supplied to the system through the inlet duct 94. The incoming air is directed to the plenum chamber 88 from which zone it is caused to travel downwardly through the apertured bottom wall 92 and thence evenly distributed through the apertured panel 93. The air then travels to the bottom wall 100 of the inner compartment through the zone defined by the inner surface of the side walls 84 of the outer housing 80 and the outer surface of side walls 98 of the inner compartment.

As the air supply enters the inner compartment it is evenly distributed by means of the apertured bottom wall 100 and rises through the perforated top 120 of the work table 118 and into the outlet plenum chamber 112 through the apertured top wall 96 of the inner compartment. Finally the air is drawn from the system through the outlet duct 114.

The various components of the system illustrated in FIG. 5 such as the lamps 116 and the heat exchange fins 104 function in the same manner as their corresponding components 48, 50, and 44, respectively, already described in connection with the embodiment illustrated in FIGS. 1, 2, and 3.

Cooperating with and supported beneath the apertured bottom wall 100, there is an apertured panel 101 which may be moved relative to the wall 100 by means of a handle 103 attached thereto. It will be appreciated that by moving the panel 101, the apertures therein may be caused to align themselves with the apertures in the associated bottom wall 101 to thereby control the amount of air which can pass therethrough.

Although the air inlet means in the species of the invention illustrated in FIGS. 1, 2, and 3 comprises merely a slot or opening 46 in the side wall 26, and a perforated bottom assembly including relatively movable panel members 100 and 101 in the species illustrated in FIG. 5, it will be clearly apparent to those skilled in the art that these structural features may be combined in a single embodiment.

According to the provisions of the patent statutes, I have illustrated and described what I now consider to be the preferred embodiments of my invention. However, I desire to have it understood that the invention may be practiced in accordance with the appended claims, otherwise than is specifically illustrated and described.

I claim:

1. An air circulating system comprising an outer housing having a top wall, side walls, and a bottom wall, an inner compartment disposed in spaced relation within said outer housing, said inner compartment including side walls and a perforated top wall, an air inlet communicating with the interior of the upper portion of said outer housing for directing air downwardly in heat exchange relation between the inner surface of the side walls of said outer housing and the outer surface of the side walls of said inner compartment, heat exchange elements affixed to the outer surface of the side walls of said inner compartment, air distributing means in said inner compartment for directing air into the interior thereof, said air distributing means including means for generally uniformly directing air from the space between the outer housing side walls and the inner compartment side walls into the inner compartment adjacent the floor of the inner compartment and an outlet chamber in communication with the perforated top wall of said inner compartment for exhausting the air within said compartment, said outlet chamber blocking communication between the perforated top wall of said inner compartment and the interior of said outer housing.

2. An air circulating system as defined in claim 1 wherein the perforations in the top wall of said inner compartment are variable and comprise two superposed relatively movable perforated panels whereby the rate of exhaust of air from within the inner compartment is readily controlled.

3. An air circulating system as defined in claim 1 wherein said air distributing means comprises a continuous slot formed in the periphery of the side walls of said inner compartment.

4. An air circulating system as defined in claim 1 wherein said air distributing means comprises a perforated floor for said inner compartment.

5. An air circulating system as defined in claim 1 wherein said system includes an access door providing access from the outside of said housing to the interior of said inner compartment, and wherein said access door is of hollow construction having a slot formed in the bottom portion thereof providing communication between the interior of said inner compartment and the hollow interior of said door and an open top portion in communication with the space between the inner surface of a side wall of said housing and the outer surface of an adjacent side wall of said inner compartment.

References Cited in the file of this patent

UNITED STATES PATENTS

| 1,002,407 | Kleinschmidt | Sept. 5, 1911 |
| 1,827,530 | LeGrand | Oct. 13, 1931 |
| 2,193,911 | Wright | Mar. 19, 1940 |
| 2,585,666 | McDowell | Feb. 12, 1952 |

FOREIGN PATENTS

| 714,638 | Great Britain | Sept. 1, 1954 |
| 1,247,476 | France | Oct. 24, 1960 |

OTHER REFERENCES

"Plant Growth Under Continuous Illumination from Sodium Vapor Lamps Supplemented by Mercury Vapor Lamps," Boyce Thompson Institute for Plant Research, Inc., Yonkers, N.Y., 1937, page 433.